United States Patent [19]
Virkler

[11] Patent Number: 5,837,296
[45] Date of Patent: Nov. 17, 1998

[54] WATER HEATED ICE CREAM SCOOP

[76] Inventor: Lois Virkler, P.O. Box 470, Downsville, N.Y. 13755

[21] Appl. No.: 762,003

[22] Filed: Dec. 11, 1996

[51] Int. Cl.[6] .................. A23G 9/04; A23G 9/22
[52] U.S. Cl. ........................... 425/277; 425/279
[58] Field of Search ................... 425/277, 279

[56] References Cited

U.S. PATENT DOCUMENTS

| | | | |
|---|---|---|---|
| 2,160,023 | 5/1939 | Kelly | 425/277 |
| 2,171,606 | 9/1939 | Shultz | 425/277 |
| 2,210,623 | 8/1940 | Kelly | 425/277 |
| 2,560,900 | 7/1951 | Shultz | 425/277 |
| 2,926,620 | 3/1960 | Fried | 425/277 |
| 3,809,520 | 5/1974 | Wilk et al. | 425/277 |

*Primary Examiner*—Khanh P. Nguyen

[57] ABSTRACT

An ice cream scoop heated by warm tap water for extracting and serving portions of a frozen product such as ice cream. This ice cream scoop would be completely hollow made of plastic, metal or other heat conducting material with a bowl shaped scoop at one end, a handle between 5 inches and 8 inches in length with an opening between 4 inches and 8 inches in circumference at the opposite end and a screw or snap on removable cap. The scoop would be filled with warm tap water at the open end of the handle, the cap would then be securely screwed or snapped on to prevent the water from draining. The heat from the tap water would conduct through to the frozen product slightly melting it making it easily gathered and served. The water can be emptied by removing the cap when necessary.

1 Claim, 2 Drawing Sheets

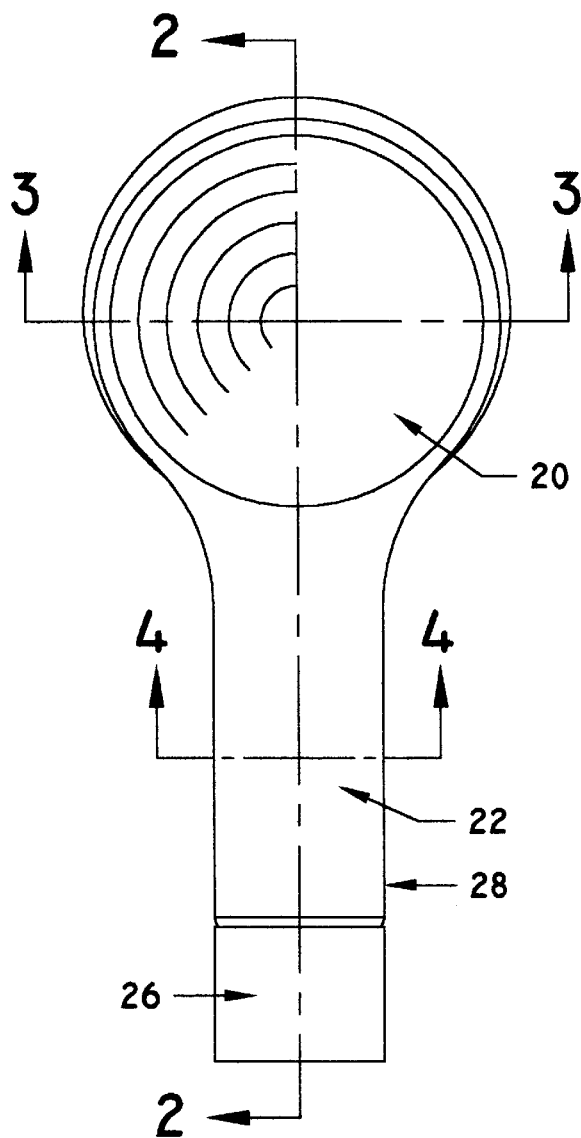
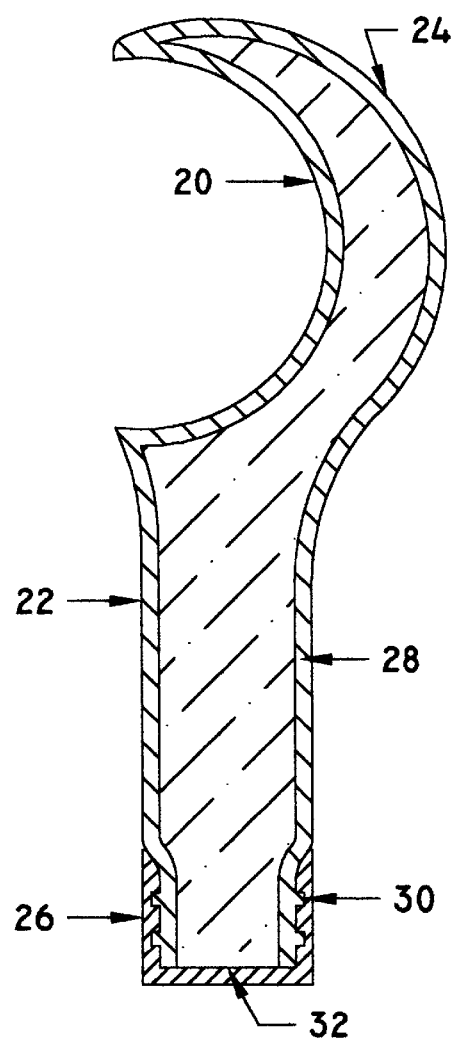

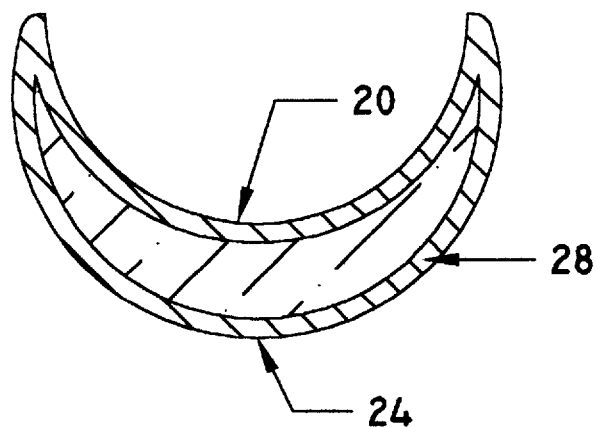
FIG. 3
FIG. 4
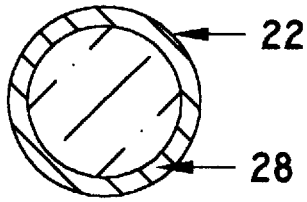
FIG. 5
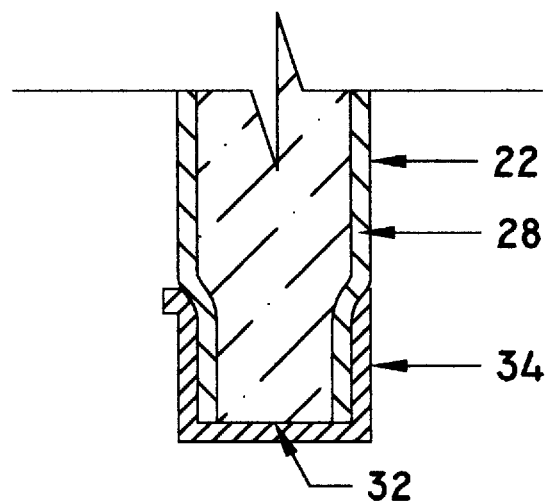

WATER HEATED ICE CREAM SCOOP

BACKGROUND—FIELD OF THE INVENTION

This invention primarily relates to ice cream scoops in particular heated ice cream scoops which facilitate the ease of removing portions of a frozen product by slightly melting the frozen product in direct contact with a heat conducting scoop powered by a heat source.

BACKGROUND—DESCRIPTION OF PRIOR ART

Most consumers of frozen products (such as ice cream) prefer to separate a serving size from the container before consuming it in order to maintain sanitation of the remaining frozen product and limit the amount consumed.

Heretofore a number of variations of the heated ice cream scoop have been proposed and implemented for the purpose of separating portions of a frozen product since through the process of heat conduction, the frozen product in direct contact with a heated ice cream scoop is slightly melted increasing the ease of gathering and serving any frozen product.

Several such tools implement the use of electricity to heat the scoop or portions of it. Users are required to provide electrical power to heat the scoop, the heated portions of the scoop would then promote the ease of separating portions of any frozen product. Users regarded this type of heated ice cream scoop as unsatisfactory for gathering and serving frozen products because they required some waiting to allow the scoop to heat, they can be cumbersome to store, awkward to use, expensive to manufacture and purchase due to the technical properties required to operate this type of heated ice cream scoop.

Another type of ice cream scoop comprises a heat retaining liquid some of these being electrically heated. This type of heated ice cream scoop allowed the user to take advantage of heat conduction through liquid or an anti-freeze element in liquid to more effectively serve a frozen product. Heated ice cream scoops such as these mentioned have all the disadvantages of electrically heated ice cream scoops, are complicated to manufacture, and pose the possible threat of the enclosed liquid escaping in case of breakage or malfunction.

Most users, therefore would find it desirable to have a heated ice cream scoop which could be heated quickly, convenient to handle and inexpensive.

OBJECTS AND ADVANTAGES

Accordingly I claim the following as the objects and advantages of my invention: to provide an ice cream scoop which is easily manufactured and efficiently heated by utilizing an accessible household resource such as warm tap water to facilitate the extracting and serving of a frozen product through a heat conducting material allowing the user to obtain the efficiency of a heated ice cream scoop without electrical apparatus, heat retaining or antifreeze liquids.

Readers will find further objects and advantages of the invention from a consideration of the ensuing description and the accompanying drawings.

DRAWING FIGURES

FIG. 1 shows a frontal view of the intended invention

FIG. 2 shows a cross-section taken along line 2—2 in FIG. 1

FIG. 3 shows a transverse sectional view taken along line 3—3 in FIG. 1

FIG. 4 shows a transverse sectional view taken along line 4—4 in FIG. 1

FIG. 5 shows a cross-section of a snap on removable cap

DRAWING REFERENCE NUMERALS 20 front of bowl shaped scoop section curved inward
22 handle between 5 inches and 8 inches in length
24 back of bowl shaped scoop section curved outward
26 removable cap
28 plastic, metal or other heat conducting material
30 screw threads
32 open end of handle between 4 inches and 8 inches in circumference
34 snap on removable cap

Single-Piece Tool—Description

FIG. 1 shows a single-piece tool according to the preferred embodiment of the invention. The tool comprises a bowl shaped scoop curved inward in the front 20, curved out in back 24 which is attached to the handle 22 including a removable cap 26 on the open end 32. The intended invention would be made of plastic, metal or other heat conducting material 28 which could be molded, so that the ice cream scoop would be hollow through the handle continuing into the scoop section, as shown in FIG. 2, FIG. 3 and FIG. 4, opening at the end of the handle 32. The open end of the handle 32 would include screw threads 30 or a snap on design 34 to secure a cap to the open end of the handle to prevent the warm tap water from leaking during use, as shown in FIG. 2 and FIG. 5.

The open end of the handle 32 is between 4 inches and 8 inches in circumference making it large enough to fit over an average faucet allowing the user to place the open end over a faucet nozzle filling the ice cream scoop with warm tap water by turning on an average household faucet. The hollow handle 22 is between 5 inches and 8 inches long so that it can hold enough warm tap water to heat the ice cream scoop and keep it warm during the time of an average use.

Single-Piece Tool—Operation

To use the intended invention for removing and serving a portion of a frozen product, the user should remove cap 26 or cap 34, fill with warm tap water through the open end of handle 32, replace removable cap 26 or cap 34, use bowl shaped scoop section 20 while holding by handle 22 to gather desired amount of a frozen product and place portion in receptacle.

Since the handle 22 of this intended ice cream scoop is between 5 inches and 8 inches in length it will hold enough warm water to heat the scoop long enough for average household use. The opening at the handle end 32 is between 4 inches and 8 inches in circumference in order to fit over an average household faucet allowing the user to fill the ice cream scoop with warm tap water to provide a heat source for this ice cream scoop.

The temperature of the warm tap water used to fill the scoop should never exceed a temperature which is comfortable when directly touching the skin, unless an insulator of some kind is used.

The heat from the tap water will conduct through the plastic, metal or other heat conducting material 28 slightly melting the frozen product, increasing the ability of the user to efficiently gather and serve a portion of any desired frozen product.

The user could drain the warn tap water when their task is complete and replace the warm tap water whenever necessary.

The above description should serve as exemplification's of the preferred embodiments of the intended invention. Those skilled in the art of manufacturing similar kinds of tools may envision many other possible variations within it's scope. A skilled artisan will be able to produce the intended invention with the most efficient dimensions of any of the embodiments contained within this description such as the bowl shaped scoop section, handle and removable cap. Accordingly, the reader is requested to determine the scope of the invention by the appended claims and their legal equivalents, and not by the examples which have been given.

I claim:

1. An ice cream scoop comprising:

a bowl shaped section having a concave front surface forming a rim at the highest point of said concave front surface rounding outward forming a back surface and a handle between 5 inches and 8 inches in length extending from said front and back surfaces of said bowl shaped section in the same direction from one side of said bowl shaped section forming a hollow tunnel interior throughout said handle and said bowl shaped section forming an opening between 4 inches and 8 inches in circumference at the end of said handle opposite said bowl shaped section whereby said ice cream scoop can be filled with warm tap water.

* * * * *